(12) United States Patent
Cappellini

(10) Patent No.: US 11,147,409 B2
(45) Date of Patent: Oct. 19, 2021

(54) DEVICE AND PROCESS FOR CONTROLLING THE EXTRACTION PRESSURE OF COFFEE IN AN ESPRESSO COFFEE MACHINE

(71) Applicant: Davide Cappellini, Soncino (IT)

(72) Inventor: Davide Cappellini, Soncino (IT)

(73) Assignee: CARIMALI S.P.A., Bergamo (IT)

( * ) Notice: Subject to any disclaimer, the term of this patent is extended or adjusted under 35 U.S.C. 154(b) by 391 days.

(21) Appl. No.: 16/250,616

(22) Filed: Jan. 17, 2019

(65) Prior Publication Data

US 2020/0229634 A1    Jul. 23, 2020

(51) Int. Cl.
| | |
|---|---|
| A47J 31/36 | (2006.01) |
| A47J 31/54 | (2006.01) |
| A47J 31/46 | (2006.01) |
| A47J 31/34 | (2006.01) |
| A47J 31/24 | (2006.01) |

(52) U.S. Cl.
CPC .............. *A47J 31/36* (2013.01); *A47J 31/34* (2013.01); *A47J 31/46* (2013.01); *A47J 31/54* (2013.01); *A47J 31/24* (2013.01)

(58) Field of Classification Search
CPC .. A47J 31/32; A47J 31/34; A47J 31/36; A47J 31/24
USPC ....................................... 99/302 R
See application file for complete search history.

(56) References Cited

U.S. PATENT DOCUMENTS

| | | | |
|---|---|---|---|
| 726,793 | A | 4/1903 | Bezzera |
| 2,878,747 | A | 3/1959 | Cimbali |
| 3,119,322 | A | 1/1964 | Valente |
| 3,230,974 | A | 1/1966 | Valente |
| 5,259,297 | A * | 11/1993 | Giuliano ............... A47J 31/007 99/282 |
| 7,316,178 | B2 * | 1/2008 | Halliday ............. A47J 31/0673 99/295 |
| 10,149,570 | B2 * | 12/2018 | Sampaoli ............. A47J 31/465 |

(Continued)

FOREIGN PATENT DOCUMENTS

| | | |
|---|---|---|
| CH | 262232 | 9/1949 |
| EP | 2314183 A1 | 4/2011 |

(Continued)

OTHER PUBLICATIONS

Office Action issued in European Patent Application No. 19220221.6-1004 dated Sep. 23, 2020; 4 pages.

(Continued)

*Primary Examiner* — Reginald Alexander

(74) *Attorney, Agent, or Firm* — Cantor Colburn LLP

(57) ABSTRACT

An espresso coffee machine including a main boiler, a dispensing group, a secondary boiler, a main water inlet circuit, hydraulically connected to the main boiler and to each secondary boiler and an electronic control unit, where the main water inlet circuit has a booster pump, the machine further includes a pressure sensor, a bypass circuit hydraulically, and a two-way proportional valve configured to recirculate a part of delivery flow of the booster pump on the main water inlet circuit and upstream of the booster pump, in order to maintain a certain coffee extraction pressure value in each dispensing group set in real time by the pressure sensor.

24 Claims, 1 Drawing Sheet

(56) References Cited

U.S. PATENT DOCUMENTS

| | | | |
|---|---|---|---|
| 2008/0245238 A1* | 10/2008 | Huiberts | A47J 31/469 99/300 |
| 2013/0129885 A1* | 5/2013 | Doglioni Majer | A47J 31/368 426/431 |
| 2016/0287007 A1 | 10/2016 | Barnett et al. | |
| 2016/0296065 A1* | 10/2016 | Doglioni Majer | A23F 5/262 |

FOREIGN PATENT DOCUMENTS

| | | |
|---|---|---|
| IT | 1131532 | 5/1980 |
| KR | 101407283 B1 | 6/2014 |
| WO | 2015056241 A1 | 4/2015 |
| WO | 2015124592 A1 | 8/2015 |
| WO | 2017068021 A1 | 4/2017 |

OTHER PUBLICATIONS

European Search for corresponding application 18181974; Report dated Sep. 3, 2018.

Search Report issued in European Patent Application No. 18 18 1974, completed Sep. 3, 2018; 1 page.

Search Report issued in European Patent Application No. 19220221.6-1004, completed Mar. 23, 2020; 5 pages.

Search Report issued in Italian Patent Application No. 201700081412, completed Feb. 8, 2018; 6 pages.

* cited by examiner

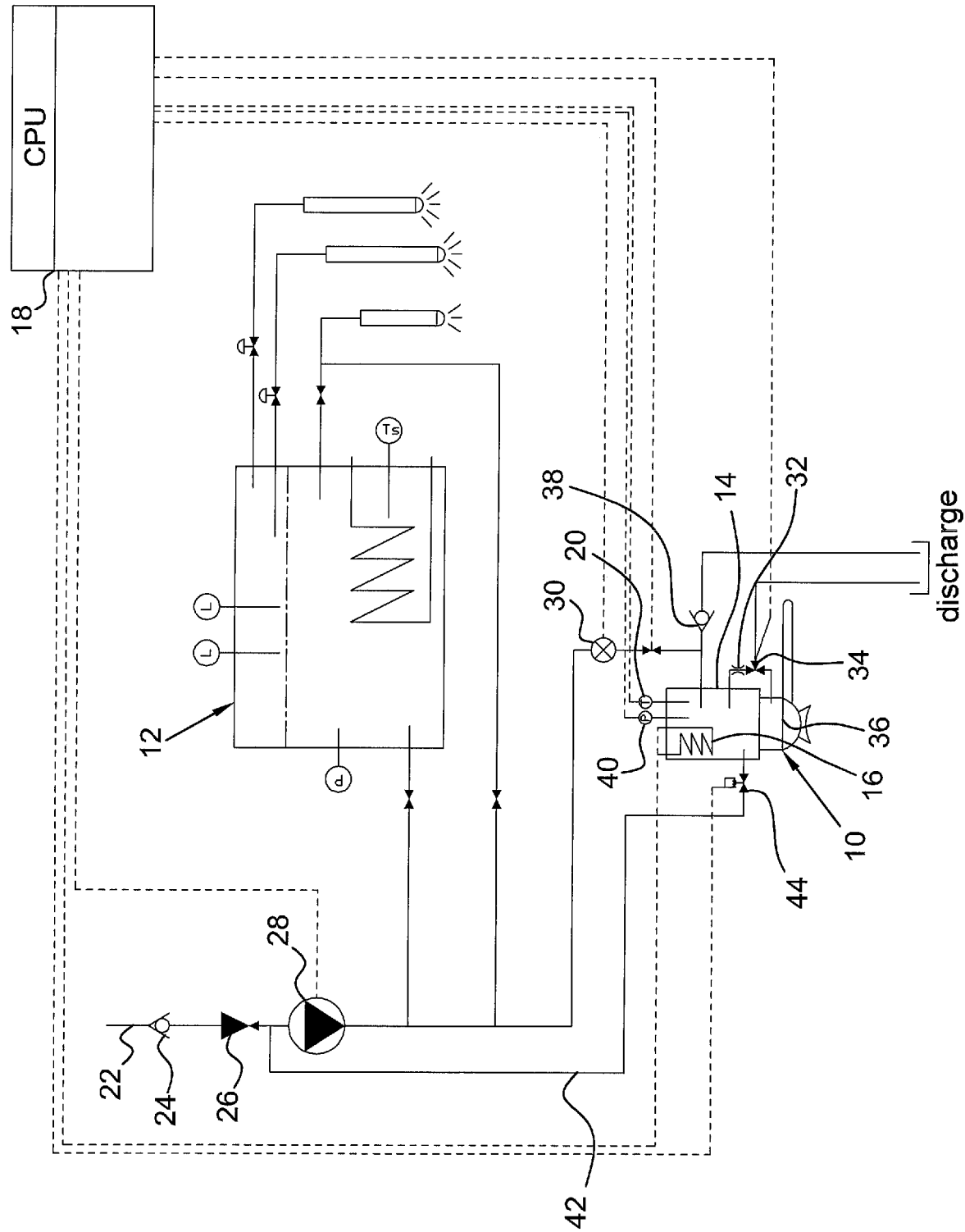

DEVICE AND PROCESS FOR CONTROLLING THE EXTRACTION PRESSURE OF COFFEE IN AN ESPRESSO COFFEE MACHINE

TECHNICAL FIELD

The present disclosure relates in general to an espresso coffee machine and, in particular, to a device and a process for controlling the extraction pressure of coffee in an espresso coffee machine.

BACKGROUND

Espresso coffee is a beverage obtained starting from coffee powder. The coffee powder for preparing espresso coffee is obtained through grinding roasted coffee beans. The process for preparing an espresso coffee typically takes place through three different steps. A first step, so-called flooding or pre-brewing, envisages filling with water the interstitial cavities of the layer of coffee powder, so as to prevent a subsequent jet of pressurised water from indenting the surface of the layer. A second step, so-called extraction step, envisages the passage of water at optimal pressure and temperature through the layer of coffee powder. The extraction process is very complex and involves different chemical and physical phenomena. Finally, the dispensing ends with the emulsion process of the oils extracted in the previous step, through which the beverage assumes the creamy appearance that distinguishes it.

In order to perform the espresso coffee production process, specific apparatuses are used called espresso coffee machines. One of the first models of espresso coffee machine is disclosed in U.S. Pat. No. 726,793, filed in 1902, which describes an apparatus that allows the water coming from a boiler under pressure to be forced through the ground coffee powder, which is located in a specific perforated container. The improvements developed over time have constantly led towards the temperature and pressure generated by these apparatuses reaching the ideal conditions to obtain a maximum quality beverage. In fact, the espresso coffee produced with current apparatuses differs considerably from that obtained with the apparatus disclosed in U.S. Pat. No. 726,793.

In order to force the passage of hot water through the coffee powder, apparatuses of the type described in U.S. Pat. No. 726,793 use the thrust of the pressure generated by a saturated steam boiler. This pressure has a value comprised between about 1 bar and about 1.5 bar. In these apparatuses the pressure is connected with the temperature of the boiler from the Mollier diagram. Since to obtain a good quality beverage the water for its production must not exceed 100° C., the coffee obtained with these apparatuses tends to have a "burned" flavour. The extraction pressure of the coffee is therefore a compromise between the need to optimise the thrust for forcing the water through the coffee powder and the need not to reach certain temperature values, which would make the beverage unacceptably "burned".

Attempts to improve the coffee extraction process have over time led to the development of increasingly efficient devices for generating the water pressure. Some pressure generation devices are disclosed, for example, in CH 262232 and U.S. Pat. No. 2,878,747. Document U.S. Pat. No. 3,119,322 instead describes an espresso coffee machine with which it is possible to considerably increase the pressure with which the water is forced to pass through the coffee powder, independently from the temperature. In detail, CH 262232 describes an espresso coffee machine of the so-called lever type, where the pressure is given to the water by a piston maneuvered through a lever and pushed by a spring. U.S. Pat. No. 2,878,747 describes an espresso coffee machine of the hydraulic type, where the pressure is given to the water by a piston activated through a hydraulic actuator. U.S. Pat. No. 3,119,322 finally describes an espresso coffee machine where the pressure is generated by a rotary pump. With respect to espresso coffee machines of the previous generation, the characteristics of the beverage have been completely reviewed.

The espresso coffee machine described in U.S. Pat. No. 3,119,322, which is provided with a pump that directly generates the desired pressure, is the one that over time has become consolidated as the simplest and most efficient. In fact, all modern espresso coffee machines operate with a pump that directly forces the passage of the hot water through the coffee powder.

However, the first applications of pump systems have led to a focus on the phenomenon by which, to obtain a good quality beverage, before applying the thrust of the pump it was necessary to flood the ground coffee powder for some seconds with water at low pressure (flooding or pre-brewing step). In lever machines and in hydraulic ones this process took place automatically during the step of raising the piston, when the water coming from the heater, at a pressure of less than 1.5 bar, flooded the compression chamber under the bottom of which the filter for the coffee powder was located.

To ensure that the dispensing cycle is started with a flooding step at low pressure it was therefore necessary to resort to measures and devices of the type disclosed in U.S. Pat. No. 3,230,974. A similar device is known as a brewing valve. Starting from the brewing valve described in U.S. Pat. No. 3,230,974 and up to now, every new espresso coffee machine has had the need to realise this initial pre-brewing step, which consists of wetting the coffee powder without applying a significant extraction pressure.

In more recent times, thanks to the greater spread and use of electronic systems inside espresso coffee machines, new technical solutions have appeared on the market able to automatically and accurately control the pressurisation process of the coffee layer. Two recent technical solutions for pressurising the coffee layer are disclosed, for example, in WO 2017/068021 and EP 2314183.

In WO 2017/068021 the pressure regulation mechanism is performed by the use of a plurality of pumping systems. These pumping systems, in addition to working in cascade, are specialised for each dispensing unit, as document WO 2017/068021 illustrates in particular a professional espresso coffee machine for coffee bars provided with a plurality of dispensing units.

This technical solution notably increases the complexity and the cost of the hydraulic circuit of the espresso coffee machine. For example, for an espresso coffee machine with three dispensing units at least four pumping systems must be used, i.e. a booster pump and an individual pressure regulation pump for each dispensing unit. All the pumping systems must be controlled by a rather complex electronic control system, able to vary the rotation speed of each motor coupled with the respective pumping bodies so as to obtain the independent pressure variation of each dispensing unit.

In EP 2314183 the pressure adjustment is obtained by changing the flow rate which is adjusted through a proportional valve. The proportional valve is able to electronically adjust the flow rate of the hydraulic circuit in which it is inserted.

This second technical solution also has various limitations. The most important one comes from the fact that the proportional valve operates, in practice, like a variable throttle valve. In other words, when faced with a pressure variation request, the proportional valve is not able to do anything other than vary the flow rate of the hydraulic circuit. These proportional valves have notable maximum flow rate limits, since for functional reasons they are sized on very small passage orifices, typically with diameters of around 1-1.5 mm, to obtain for example the low pressures such as those necessary for the pre-brewing step (1-1.5 bar). Since these proportional valves have the maximum pressure determined by the calibration of the pump (typically even 12 bar) at their inlet, they are forced to operate in a lower range of flow rates than those necessary for the optimal extraction of the coffee.

In fact, if the example of the lever machine as described in CH 262232 is considered, it allows in the pre-brewing step, upon lifting the piston for loading the brewing chamber with the right amount of water, the pressure to be kept around the pressure level of the boiler (1-1.5 bar) but without any flow rate limit. The coffee layer is soaked uniformly thanks to the good flow rate of water which instantaneously floods the whole surface of the layer itself, while remaining within the desired pressure limits.

In the event, instead, of espresso coffee machines that use a proportional valve as a flow rate limiter, it is not practically possible to perform the same pre-brewing step with low pressure but maximum flow rate, as the flow rate is limited by the throttling in the proportional valve itself. Performing a pre-brewing step, although at low pressure, but with an insufficient flow rate, such as not to allow an immediate flooding of the whole surface of the coffee layer, can create preferential routes for the passage of water through the coffee layer itself, consequently creating non-optimal extraction.

BRIEF SUMMARY

The aim of the present disclosure is therefore that of providing a device and a process for controlling the extraction pressure of coffee in an espresso coffee machine that are able to solve the drawbacks of the prior art mentioned above in an extremely simple, cheap and particularly functional way.

In detail, the present disclosure provides an espresso coffee machine in which the adjustment of the extraction pressure, in all the beverage dispensing steps, can be performed either through a direct manual command, or through an automatic pre-set and electronically managed cycle.

The disclosure further provides an espresso coffee machine in which it is possible to obtain control of the extraction pressure using a single pumping system, also in the event in which the espresso coffee machine is provided with various dispensing groups working simultaneously.

The disclosure also provides an espresso coffee machine that is able to guarantee the control of the extraction pressure without any flow-rate limitation of the brewing water throughout all the dispensing steps, including the more delicate pre-brewing step.

The disclosure realizes an espresso coffee machine that allows high precision and efficiency of the extraction pressure control process, thanks to a relationship between the operation of the pumping system and that of the electronically controlled individual bypass valves, which split the pressure level between each dispensing group.

BRIEF DESCRIPTION OF THE DRAWING

The characteristics and advantages of an espresso coffee machine according to the present disclosure shall become clearer from the following exemplifying and non-limiting description, with reference to the accompanying schematic drawings, in which the only FIGURE schematically shows the hydraulic and electronic circuits of such espresso coffee machine.

DETAILED DESCRIPTION

With reference to the FIGURE, the hydraulic and electronic circuits, as well as the main components, of the espresso coffee machine according to the present disclosure, are shown. The espresso coffee machine comprises at least one dispensing group 10, provided for producing the coffee and physically and functionally independent from a main boiler 12, provided for producing hot water and steam.

The temperature control of the water for producing the coffee is performed according to a known way, described for example in IT 1131532. In practice, each dispensing group 10 is physically and hydraulically connected to a small secondary boiler 14 provided to keep the water for dispensing coffee at a predetermined temperature value, considered suitable for making the beverage. Such predetermined temperature value is obtained through the controlled activation of at least one heating element 16, belonging to the secondary boiler 14 of each dispensing group 10 and appropriately controlled by an electronic control unit 18 of the espresso coffee machine. The electronic control unit 18 receives an input temperature signal, identified by a temperature probe 20 provided with a sensitive element enclosed within the secondary boiler 14 of each dispensing group 10 and placed in contact with the single-phase fluid consisting of the water.

A main water inlet circuit 22 for inletting water from the water supply network is hydraulically connected to the main boiler 12, and to the secondary boiler 14 of each dispensing group 10. Along the main water inlet circuit 22 at least one non-return valve 24 and at least one pressure reducing device 26 are arranged in sequence, normally calibrated at 1 bar, which stabilises the base operating pressure value of the hydraulic circuit and compensates for any possible pressure variations in the water coming from the water supply network. Along the main water inlet circuit 22, downstream of the pressure reducing device 26, at least one booster pump 28, at least one flow meter 30 and at least one throttling nozzle 32 are also arranged in sequence.

The throttling nozzle 32 calibrates the maximum flow rate of water entering into a respective dispensing group 10 through a dispensing valve 34, that in turn determines the start and the end of dispensing, making the brewing water pass from the secondary boiler 14 of each dispensing group 10 to a brewing chamber 36 of said dispensing group 10. The brewing chamber 36 of each dispensing group 10 comprises, in a known way, a water diffusion shower head, a filter containing the coffee powder and the related filter holder. The dispensing valve 34 is typically a 3-way solenoid valve that, in the deactivation step, puts the brewing chamber 36 in communication with a duct at atmospheric pressure, so as to discharge the residual overpressure of the brewing chamber 36 that is generated at the end of the dispensing of the beverage.

The secondary boiler 14 of each dispensing group 10 is hydraulically connected to a mechanical overpressure safety valve 38, configured to activate in the case in which, due to the heating of the water with consequent increase in volume, there is a pressure increase that goes beyond a predetermined maximum pressure value, i.e. the maximum operating value of the hydraulic circuit intended for producing the espresso coffee. Typically, this maximum pressure value must not exceed 13 bar.

According to the disclosure, the process of adjusting the coffee extraction pressure involves the electronic control unit 18, the booster pump 28, which applies a predetermined pressure value to the water, and a pressure sensor 40, provided with a sensitive element enclosed within the secondary boiler 14 of each dispensing group 10 and placed in contact with the single-phase fluid consisting of water. The espresso coffee machine further comprises a bypass circuit 42 hydraulically connected, at a first end, to the main water inlet circuit 22 upstream of the booster pump 28, preferably between the pressure reducing device 26 and such booster pump 28, and, to each dispensing group 10 at the opposite end.

The bypass circuit 42 is provided with at least one two-way proportional valve 44, electronically controlled by the electronic control unit 18 and having a specific bypass function. The two-way proportional valve 44 is, in fact, configured to recirculate a part of delivery flow of the booster pump 28 itself on the main water inlet circuit 22 at low pressure and upstream of the booster pump 28, in order to maintain a certain coffee extraction pressure value in each dispensing group 10 set in real time by the pressure sensor 40.

More in detail, when the dispensing of the beverage is requested, the booster pump 28, which takes water from the main water supply network through the main water inlet circuit 22, and the dispensing valve 34, which makes the brewing water pass from the secondary boiler 14 of each dispensing group 10 to the brewing chamber 36 of said dispensing group 10, are activated simultaneously. The pressure sensor 40 monitors in real time the pressure value that is generated inside the secondary boiler 14 of each dispensing group 10, which is in hydraulic communication with the respective brewing chamber 36. Since water is an incompressible liquid, the pressure value between the secondary boiler 14 of each dispensing group 10 and the brewing chamber 36 is univocal.

It is therefore possible to control and vary in real time the extraction pressure value by acting through the controlled modulation of the two-way proportional bypass valve 44. This two-way proportional bypass valve 44, being arranged on the bypass circuit 42 that constitutes a derivation of the main delivery flow of the brewing chamber 36, has the ability to influence the coffee extraction pressure without creating any further throttling on the main water inlet circuit 22 which infuses the coffee layer. This control also has the advantage of operating with very quick response times, as even limited water flows, recirculating through the bypass circuit 42 and the two-way proportional bypass valve 44, are sufficient to significantly vary the pressure value of the main flow.

Based on a first operating mode of the espresso coffee machine, the pressure variation can take place through a manual control by an operator. Using a control device (not shown), functionally connected to the electronic control unit 18, the operator can increase or reduce the recirculation flow quantity by means of the two-way proportional bypass valve 44. The operator can therefore have display feedback on the pressure through the electronic control unit 18, which communicates with the pressure sensor 40.

In order to be able to operate in all the water supply configurations, the two-way proportional bypass valve 44 needs a pressure reducing device 26 appropriately calibrated so that the water inlet pressure is lower than the minimum extraction pressure. It is in fact known that in some water supply networks the supply pressure can reach high levels, comprised between 4 bar and 6 bar.

A second operating mode of the espresso coffee machine envisages storing, inside the electronic control unit 18, a set of predetermined pressure curves that the espresso coffee machine is capable of reproducing autonomously with the simple activation of the beverage dispensing command. A third operating mode of the espresso coffee machine finally envisages a self-learning step, by the electronic control unit 18, of one or more pressure values set manually by the operator, which are stored automatically within a set of predetermined pressure curves so that each predetermined pressure value can then be reproduced automatically and repetitively by the espresso coffee machine.

Thus, it has been seen that the espresso coffee machine according to the present disclosure achieves the aim and objects set forth above. The espresso coffee machine according to the present disclosure allows the extraction profile of lever machines to be reproduced faithfully, automated and controlled, overcoming the limits of the systems described in WO 2017/068021 and EP 2314183. These lever machines are still recognised by persons skilled in the art as one of the best systems for producing espresso coffee, still being present on the market.

The espresso coffee machine according to the present disclosure thus conceived is susceptible to many modifications and variants, all falling within the same inventive concept; furthermore, all the details can be replaced by technically equivalent elements. The materials used, as well as the shapes and dimensions, may in practice be of any type according to technical requirements.

The protective scope of the disclosure is therefore defined by the appended claims.

The invention claimed is:

1. An espresso coffee machine comprising:
   at least one dispensing group to produce coffee;
   a first water boiler hydraulically connected to the dispensing group and configured to heat the water at a predetermined temperature;
   a water supply circuit hydraulically connected to the water boiler and comprising a water pump operable to supply pressurised water to the first water boiler;
   an electronic control unit;
   a pressure sensor provided with a sensitive element associated with the first water boiler to sense the water pressure in the first water boiler; and
   a bypass circuit hydraulically connected, at a first end, to the dispensing group and comprising a two-way proportional valve electronically controllable by the electronic control unit to drain part of the delivery flow of the water pump to maintain a certain coffee extraction pressure in the dispensing group based on an output of the pressure sensor.

2. The espresso coffee machine of claim 1, wherein the bypass circuit has a second end hydraulically connected to the water supply circuit, upstream from the water pump; and wherein the two-way proportional valve is electronically controllable by the electronic control unit to recirculate part of the delivery flow of the water pump on the water supply circuit, upstream from the water pump.

3. The espresso coffee machine of claim 1, further comprising a plurality of dispensing groups, each hydraulically connected to the first water boiler.

4. The espresso coffee machine of claim 1 further comprising a second water boiler hydraulically connected to the water supply circuit, physically and functionally independent from the first water boiler, and configured to produce hot water and steam.

5. The espresso coffee machine of claim 1, wherein the water pump is a booster pump operable to pressurise water from the mains at a predetermined pressure.

6. The espresso coffee machine of claim 1, wherein the water supply circuit further comprises at least one pressure reducing device arranged upstream from the booster pump.

7. The espresso coffee machine of claim 1, wherein the first water boiler is provided with at least one heating element controllable by the electronic control unit to keep the water at said predetermined temperature.

8. The espresso coffee machine of claim 1, wherein the water supply circuit comprises at least one throttling nozzle arranged downstream of the water pump to calibrate the maximum flow rate of water entering into the dispensing group through a dispensing valve operable to cause a certain amount of water to pass from the first water boiler to a brewing chamber of the dispensing group.

9. The espresso coffee machine of claim 1, wherein the first water boiler is hydraulically connected to a mechanical overpressure safety valve.

10. An espresso coffee machine comprising:
a main boiler, configured for producing hot water and steam;
at least one dispensing group, configured for producing coffee and physically and functionally independent from said main boiler;
a secondary boiler physically and hydraulically connected to each dispensing group, said secondary boiler being configured to keep the water for dispensing coffee at a predetermined temperature value;
a main water inlet circuit for inletting water from a water supply network, hydraulically connected to the main boiler and to the secondary boiler of each dispensing group, said main water inlet circuit comprising at least one booster pump that applies a predetermined pressure value to the water; and
an electronic control unit,
a pressure sensor, provided with a sensitive element enclosed within the secondary boiler of each dispensing group and placed in contact with the water;
a bypass circuit hydraulically connected, at a first end, to said main water inlet circuit upstream of the booster pump and, at the opposite end, to each dispensing group; and
at least one two-way proportional valve, arranged on the bypass circuit and electronically controlled by the electronic control unit, said two-way proportional valve being configured to recirculate a part of delivery flow of said booster pump on said main water inlet circuit and upstream of the booster pump, in order to maintain a certain coffee extraction pressure value in each dispensing group set in real time by the pressure sensor.

11. The espresso coffee machine according to claim 10, wherein the secondary boiler of each dispensing group is provided with at least one heating element controlled by the electronic control unit to keep the water for dispensing coffee at said predetermined temperature value.

12. The espresso coffee machine according to claim 10, wherein said main water inlet circuit comprises at least one non-return valve, arranged upstream of the booster pump.

13. The espresso coffee machine according to claim 12, wherein said main water inlet circuit comprises at least one pressure reducing device, arranged downstream of the non-return valve and upstream of the booster pump.

14. The espresso coffee machine according to claim 10, wherein said main water inlet circuit comprises at least one flow meter, arranged downstream of the booster pump.

15. The espresso coffee machine according to claim 10, wherein said main water inlet circuit comprises at least one throttling nozzle, arranged downstream of the booster pump, said throttling nozzle calibrating the maximum flow rate of water entering into a respective dispensing group through a dispensing valve, that in turn determines the start and the end of dispensing, making the brewing water pass from the secondary boiler of each dispensing group to a brewing chamber of said dispensing group.

16. The espresso coffee machine according to claim 15, wherein the dispensing valve is a 3-way solenoid valve that, in the deactivation step, puts the brewing chamber in communication with a duct at atmospheric pressure, so as to discharge the residual overpressure of the brewing chamber that is generated at the end of the dispensing of the beverage.

17. The espresso coffee machine according to claim 10, wherein the secondary boiler of each dispensing group is hydraulically connected to a mechanical overpressure safety valve, configured to activate in the case in which, due to the heating of the water with consequent increase in volume, there is a pressure increase that goes beyond a predetermined maximum pressure value.

18. The espresso coffee machine of claim 17, wherein the dispensing valve is a 3-way solenoid valve operable to put the brewing chamber in communication with a duct at atmospheric pressure, so as to discharge any residual overpressure existing in the brewing chamber at the end of the coffee dispensing.

19. An espresso coffee machine comprising:
at least one dispensing group to produce coffee;
a first water boiler hydraulically connected to the dispensing group and configured to heat the water at a predetermined temperature;
a water supply circuit hydraulically connected to the water boiler and comprising a water pump operable to supply pressurised water to the first water boiler;
an electronic control unit;
a pressure sensor provided with a sensitive element associated with the first water boiler to sense the water pressure in the first water boiler; and
a bypass circuit hydraulically connected, at a first end, to the dispensing group and comprising a two-way proportional valve electronically controllable by the electronic control unit to drain part of the delivery flow of the water pump to maintain a certain coffee extraction pressure in the dispensing group based on an output of the pressure sensor, wherein the bypass circuit between the two way proportional valve and the dispensing group is directly connected thereto and free of any additional valves.

20. An espresso coffee machine comprising:
at least one dispensing group to produce coffee;
a first water boiler hydraulically connected to the dispensing group and configured to heat the water at a predetermined temperature;

a water supply circuit hydraulically connected to the water boiler and comprising a water pump operable to supply pressurised water to the first water boiler;

an electronic control unit;

a pressure sensor provided with a sensitive element associated with the first water boiler to sense the water pressure in the first water boiler; and a bypass circuit hydraulically connected, at a first end, to the dispensing group and comprising a two-way proportional valve electronically controllable by the electronic control unit configured to recirculate and drain part of the delivery flow of the water pump to maintain a certain coffee extraction pressure in the dispensing group based on an output of the pressure sensor.

21. A process for controlling the coffee extraction pressure in an espresso coffee machine comprising:

taking water from a water supply network through a booster pump and a main water inlet circuit;

introducing the water into at least one dispensing group;

heating the water to a predetermined temperature value through a secondary boiler of said at least one dispensing group;

monitoring in real time, through a pressure sensor, a pressure value that is generated inside the secondary boiler of said at least one dispensing group;

adjusting said pressure value in real time through a controlled modulation of a two-way proportional bypass valve, which recirculates a part of delivery flow of said booster pump on said main water inlet circuit through a bypass circuit.

22. The process according to claim 21, wherein adjusting said pressure value in real time is carried out through a manual control by an operator.

23. The process according to claim 21 further comprising storing inside an electronic control unit a set of predetermined pressure curves that the espresso coffee machine is capable of reproducing autonomously when a beverage dispensing command is activated.

24. The process according to claim 23 further comprising a self-learning step, by the electronic control unit, of one or more pressure values set manually by an operator, said one or more pressure values being stored automatically within the set of predetermined pressure curves so that each predetermined pressure value can then be reproduced automatically and repetitively by the espresso coffee machine.

* * * * *